US009820200B2

(12) United States Patent
Potra et al.

(10) Patent No.: US 9,820,200 B2
(45) Date of Patent: Nov. 14, 2017

(54) CAPTIVE PORTAL STATE DETECTION AND AVOIDANCE FOR MULTIPLE-INTERFACE TRAFFIC OFFLOADING

(75) Inventors: Adrian Potra, Redmond, WA (US); Mohit Talwar, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 74 days.

(21) Appl. No.: 13/330,498

(22) Filed: Dec. 19, 2011

(65) Prior Publication Data
US 2013/0155876 A1 Jun. 20, 2013

(51) Int. Cl.
| | |
|---|---|
| H04W 36/14 | (2009.01) |
| H04L 29/06 | (2006.01) |
| H04L 12/64 | (2006.01) |
| H04W 48/14 | (2009.01) |
| H04W 24/06 | (2009.01) |
| H04L 29/08 | (2006.01) |
| H04W 8/08 | (2009.01) |

(Continued)

(52) U.S. Cl.
CPC ......... *H04W 36/14* (2013.01); *H04L 12/6418* (2013.01); *H04L 69/28* (2013.01); *H04L 67/2814* (2013.01); *H04W 8/082* (2013.01); *H04W 12/06* (2013.01); *H04W 24/06* (2013.01); *H04W 48/14* (2013.01); *H04W 80/04* (2013.01); *H04W 88/06* (2013.01)

(58) Field of Classification Search
CPC ......... H04L 29/06; H04L 47/10; H04L 63/08; H04L 12/6418; H04L 69/28; H04W 36/14
USPC ........ 370/248, 249, 254, 310, 397; 709/219, 709/232, 236, 225; 455/445, 428
See application file for complete search history.

(56) References Cited

U.S. PATENT DOCUMENTS 8,479,263 B1 * 7/2013 Liu et al. ........................ 726/3
8,594,628 B1 * 11/2013 Schroeder et al. ........... 455/411

(Continued)

FOREIGN PATENT DOCUMENTS

| CN | 1536508 | 10/2004 |
|---|---|---|
| CN | 1571356 | 1/2005 |

(Continued)

OTHER PUBLICATIONS

International Search Report and Written Opinion for International Application PCT/US2012/069985, dated Feb. 28, 2013.

(Continued)

*Primary Examiner* — Afshawn Towfighi
(74) *Attorney, Agent, or Firm* — Baker Botts L.L.P.

(57) ABSTRACT

In one embodiment, a mobile device connecting to a Wi-Fi hotspot first performs a connectivity check to determine whether the wireless connection is trapped in the walled garden of a captive portal by transmitting a connectivity check message to one or more external endpoints in the public IP network. If no response is received, the mobile device determines that it is in the captive portal state, and generates a browser window bound to the Wi-Fi state tracker of the mobile device displaying the portal page for the captive portal. In such a manner, the mobile device does not offload any traffic from its wireless cellular interface to its Wi-Fi interface until it is certain the Wi-Fi interface may access the public IP network, thereby preventing data interruption for mobile applications.

20 Claims, 8 Drawing Sheets

(51) Int. Cl.
*H04W 88/06* (2009.01)
*H04W 12/06* (2009.01)
*H04W 80/04* (2009.01)

(56) References Cited

U.S. PATENT DOCUMENTS

| | | | |
|---|---|---|---|
| 2003/0220989 A1* | 11/2003 | Tsuji et al. | 709/220 |
| 2004/0214576 A1* | 10/2004 | Myers et al. | 455/445 |
| 2008/0113692 A1 | 5/2008 | Zhao | |
| 2009/0279492 A1 | 11/2009 | Montemurro | |
| 2012/0113965 A1* | 5/2012 | Puthenpura | H04W 28/08 370/338 |
| 2012/0315905 A1* | 12/2012 | Zhu et al. | 455/436 |

FOREIGN PATENT DOCUMENTS

| | | |
|---|---|---|
| CN | 101622821 | 1/2010 |
| EP | 2 134 063 | 12/2009 |
| EP | 2 385 730 | 11/2011 |
| JP | 2008-199137 | 8/2008 |
| JP | 2009-276925 | 11/2009 |
| JP | 2011-041319 | 2/2011 |
| WO | 2004/098143 A1 | 11/2004 |

OTHER PUBLICATIONS

Victor O.K. et al, "Personal Communication Systems," Proceedings of the IEEE, vol. 83, No. 9; 34 pgs, Sep. 1995.
Extended European Search Report for EP Application 12859208.6-1854 /2795969, dated Oct. 8, 2015.
Notification of Reasons for Rejection for JP 2014-549159, dated Aug. 23, 2016.
Substantive Examination Report for MX /a/2014/007463, dated Jul. 27, 2016.
EP Communication for EP 12 859 208.6-1854, dated Aug. 16, 2017.
Notification of First Office Action for CN 2012800691634, dated Jul. 31, 2017.

* cited by examiner

CAPTIVE PORTAL STATE DETECTION AND AVOIDANCE FOR MULTIPLE-INTERFACE TRAFFIC OFFLOADING

TECHNICAL FIELD

This disclosure generally relates to connecting to wireless networks.

BACKGROUND

Mobile devices may be equipped with multiple communication interfaces, such as a radio transceiver for accessing one or more cellular networks (e.g. GPRS (general packet radio service), EDGE (enhanced data rates for gsm evolution), 3GPP (third generation partnership project), 3GPP2, and CDMA2000 (code division multiple access)), as well as a radio transceiver for accessing one or more wireless local area networks (WLANs), such as Institute of Electrical and Electronics Engineers (IEEE) 802.11 (Wi-Fi) and IEEE 802.16 (WiMAX) networks. Due to bandwidth, signal strength, data charge avoidance, battery life conservation, and other considerations, many mobile devices are configured to automatically connect to and route all data through any available wireless networks.

However, all WLANs are not free. Many WLANs host a web portal (also called "captive portals") in their default gateway or server that prevents access to the Internet (or other network) until the user of the mobile device has performed authentication, typically through entering payment information or login or password credentials or agreeing to the provider's terms of service.

Captive-portal techniques often force a Hyper Text Transfer Protocol (HTTP) client on a network to see a special Web page (usually for authentication purposes) before using the Internet normally. A captive portal turns a Web browser into an authentication device. This may be done by intercepting all packets, regardless of address or port, until the user opens a browser and tries to access the Internet. At that time, the browser may be redirected to a web page that requires authentication or payment or displays an acceptable use policy that the user must agree to. Until successful authentication, the user device may be "trapped" in the portal's "walled garden." Captive portals are often used at Wi-Fi hotspots and may be used to control wired access (e.g. in apartment houses, hotel rooms, business centers, or "open" Ethernet jacks) as well. Captive portals may use a wide variety of packet-interception techniques, such as HTTP Redirect, IP Redirect, and Domain Name Server (DNS) Redirect.

DESCRIPTION OF EXAMPLE EMBODIMENTS

Figure 1A:
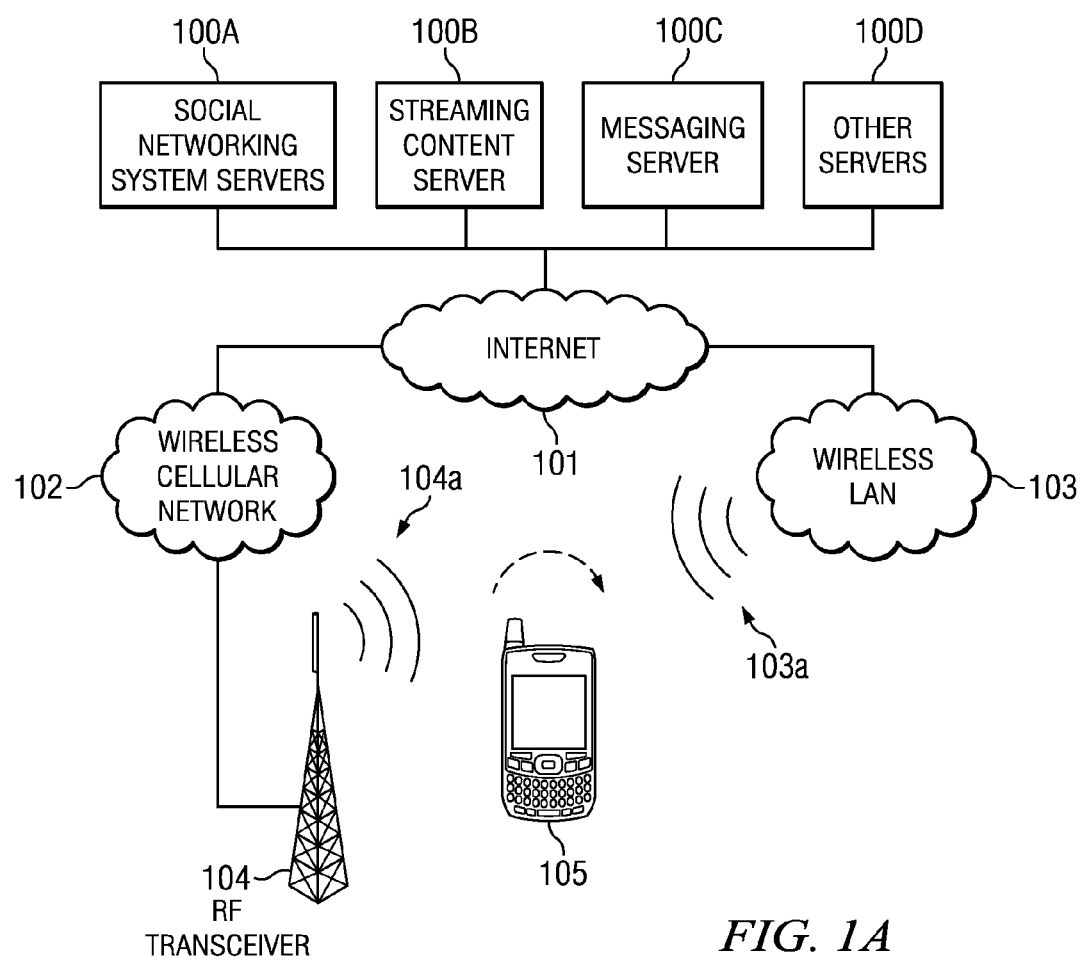
FIG. 1A illustrates an example client-server environment for a multiple-interface mobile device.

In particular embodiments, a multiple-interface mobile device, or other client device, may, upon connecting to a particular WLAN, transmit connectivity checks to an endpoint in the public IP network, and only offload traffic from its wireless cellular interface to its WLAN interface after receiving an acknowledgement (ACK) from the endpoint indicating that the device has full Internet access through the WLAN. In particular embodiments, a mobile device may, upon detecting that it is trapped in the walled garden of a captive portal, generate a browser window or user interface bound to the device's WLAN interface so that it may perform portal authentication while simultaneously maintaining data connectivity to the Internet via its wireless cellular radio interface.

As mobile applications increase in popularity, web browsers no longer remain the means through which mobile devices access the Internet. Dedicated applications may open TCP/IP connections to application servers for the purposes of receiving weather, traffic, stock updates, maps, instant messages, and the like. Of particular concern is the use of dedicated (non-browser based) social networking applications. Due to the pervasiveness of social networking in modern users' lives, many users rely exclusively on updates from social networking systems for news, events, points of interest, messaging, and other social data; users rely on social networks as both their portal to the Internet as well as to manage their own personal lives. In particular implementations, a social networking application may maintain a notification channel via a VPN tunnel or "always on" TCP/IP connection to ensure that users are immediately notified of relevant social data.

In particular embodiments, a social-networking system implemented, for example, as a social-networking website, may push communications to the client devices of its users. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

There are various types of communications that may be pushed to a client device, such as, for example and without limitation, system update messages, software update messages, advertisements, alerts, user account notices, social-networking messages, service agreement updates, or a combination of different types of communications. The content of the individual notifications may vary. Often the content of a notification may concern an entity, which may a human or a non-human entity (e.g., an organization, a location, a product, a software application, a movie, a subject matter, etc.). A notification may originate from the social-networking system (e.g., notifications on social information or social connections) or from a third party (e.g., notifications on the third-party's products or services). For further information on notification channels, please see commonly-owned U.S. patent application Ser. No. 13/096,184, entitled, "Managing Notifications Pushed to User Devices", filed on 28 Apr. 2011 and fully incorporated by reference herein.

Because of the increased use of various non-browser-based mobile applications, such as social networking applications and the aforementioned social networking notification channel, users are often unaware that they are trapped in the walled garden of a captive portal. Consequently, they may miss valuable information from their non-browser-based mobile applications, such as notifications from a social networking system through the notification channel.

FIG. 1A illustrates an example client-server environment for a multiple-interface mobile device 105. Mobile device 105 may include multiple radio interfaces for communicating with wireless cellular network 102 through RF transceiver tower 104 and to wireless LAN 103 through a wireless access point, router, or repeater (not shown). Wireless cellular network 102 may be a GSM based network (e.g., GPRS, EDGE, UMTS, HDSPA/HSUPA, LTE, 3GPP, 3GPP2), CDMA-based network (CDMA2000, WCDMA, EVDO, LTE, etc.), or any suitable cellular data connection. WLAN 103 may be an IEEE 802.11 Wi-Fi LAN, 802.16 WiMAX LAN, or any suitable WLAN. In particular embodiments, mobile device 105 may include other radio transceivers, such as for communicating with Bluetooth or Ultrawideband personal area networks. In particular embodiments, mobile device 105 may include one or more radio transceivers for communicating with various metropolitan area networks. This disclosure contemplates any suitable wireless network protocol.

Mobile device 105 maintains its connection with various third party servers 100A-D through its local browser or dedicated applications for each service via Internet 101 and one of wireless cellular network 102 or wireless LAN 103. For example, under normal operation, mobile device 105 may maintain a connection, via its carrier's wireless cellular network 102 and Internet 101, from a social networking application residing on mobile device to social networking system servers 100A. As previously described this connection may be an always-on notification channel for receiving important updates and content from the social networking system. Similarly, mobile device 105 may maintain a connection through the same path between a streaming audio application, for example Pandora, YouTube, Spotify, or Slacker Radio, to streaming content servers 100B to receive streaming music or video. As another example, mobile device 105 may maintain, via wireless cellular network 102 a connection between a chat client residing on mobile device 105 and a messaging server 100C, such as Google Talk, AOL Instant Messenger, Jabber, ICQ, Yahoo! Messenger, and the like. This disclosure contemplates any suitable server 100D transmitting and receiving packets to mobile device 105 across Internet 101.

In particular circumstances, mobile device 105 may switch over from wireless cellular network 104 (through physical media 104a) to wireless LAN 103 (through physical media 103a). In particular embodiments, mobile device 105 is configured to automatically connect to any wireless network within range. In particular embodiments, mobile device 105 switches to wireless LAN 103 based off a number of performance factors. For example, mobile device 105 may connect to WLAN 103 only if the signal strength is above a predetermined threshold, or only if WLAN meets certain bandwidth requirements. In particular embodiments, mobile device 105 may automatically connect to WLAN 103 in order to conserve battery life, or in order to avoid data overage charges. In particular embodiments, mobile device 105 may only connect to WLAN 103 after explicit user instruction. This disclosure contemplates any suitable method of connecting to an available wireless network.

Figure 1B:
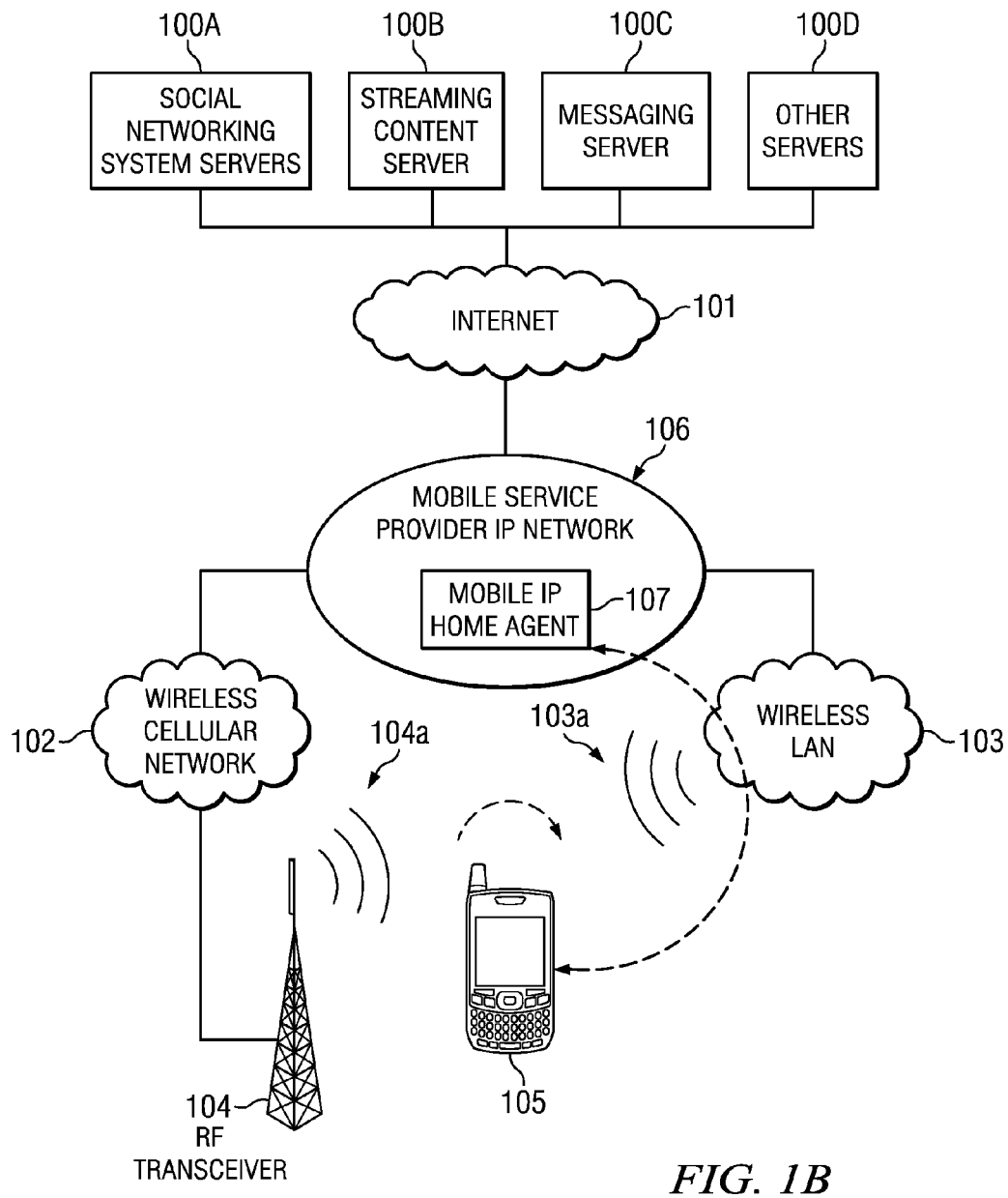
FIG. 1B illustrates an example mobile-IP handoff.

FIG. 1B illustrates the same network as FIG. 1A, with the exception that mobile device 105 utilizes mobile IP. In FIG. 1, mobile device 105 managed wireless connections 104a and 103a independently; mobile device 105 obtains two separate IP addresses and connections to Internet 101. Thus, when mobile device 105 switches over from wireless cellular network 102 to wireless LAN 103, there is no "handoff" of data; applications must re-authenticate with servers 100A-100D. In particular embodiments, mobile applications may perform this re-authentication seamlessly and without user interaction. For example, a social networking application may transmit, in its initial communication with social networking system servers 100A after connecting to WLAN 103, authentication information such as a social networking user identifier and password. In particular embodiments, social networking system servers 100A perform MAC authentication; so long as an incoming packet comes from mobile device, regardless of IP address, social networking system may respond to requests by mobile device 105. However, in the arrangement of FIG. 1, changes in IP address are handled by the applications residing on mobile device 105; there is no true "handoff" of data when mobile device 105 connects to WLAN 103.

FIG. 1B illustrates a mobile device utilizing mobile IP for traffic offloading as it connects to WLAN 103. Although FIG. 1B describes mobile IP handoff, other IP-based mobility management protocols (e.g., SIP-based mobility management) may be utilized in a similar manner. Mobility service provider 106 may be any entity that manages mobile device 105's home network; for example, cellular service provider, a home enterprise network, or an internet service provider (ISP). Cellular network 102 connects to mobility service provider 106 directly or via a standard IP network.

Generally speaking, when mobile device 105 moves from cellular network 102 to WLAN 103, mobile device 105 acquires a local IP address that it can use to receive IP packets from the new network. Mobile device 105 uses this new local IP address as its mobile IP care of address (CoA) and uses mobile IP to register the new CoA with its mobile IP home agent 107. This permits mobile device 105 to continue to receive IP packets addressed to its mobile IP home address sent by any mobile or fixed terminal that can send packets to mobile device 105's mobility service provider network 106. User IP packets addressed to mobile device 105's home address will be routed to mobile IP home agent 107, which will tunnel these packets to mobile device 105's current CoA. 3GPP Release 8 introduced dual stack mobile IP (DSMIP) to enable seamless handover between 3G and Wi-Fi. Such techniques are well-known in the art and are not further discussed here.

Regardless of whether mobile device 105 utilizes seamless handoff (as in FIG. 1A) or two independent connections (as in FIG. 1A), substantially instantaneous connectivity to Internet 101 through WLAN 103 is required for applications such as social networking applications and chat clients to function through the handoff. Interruptions due to packet redirection by a captive portal (i.e., being trapped in a walled garden) result in a total loss of connectivity for the user, often without his or her knowledge due to the fact that the user of mobile device 105 is not surfing the web via a browser at the time of handoff.

Figure 2:
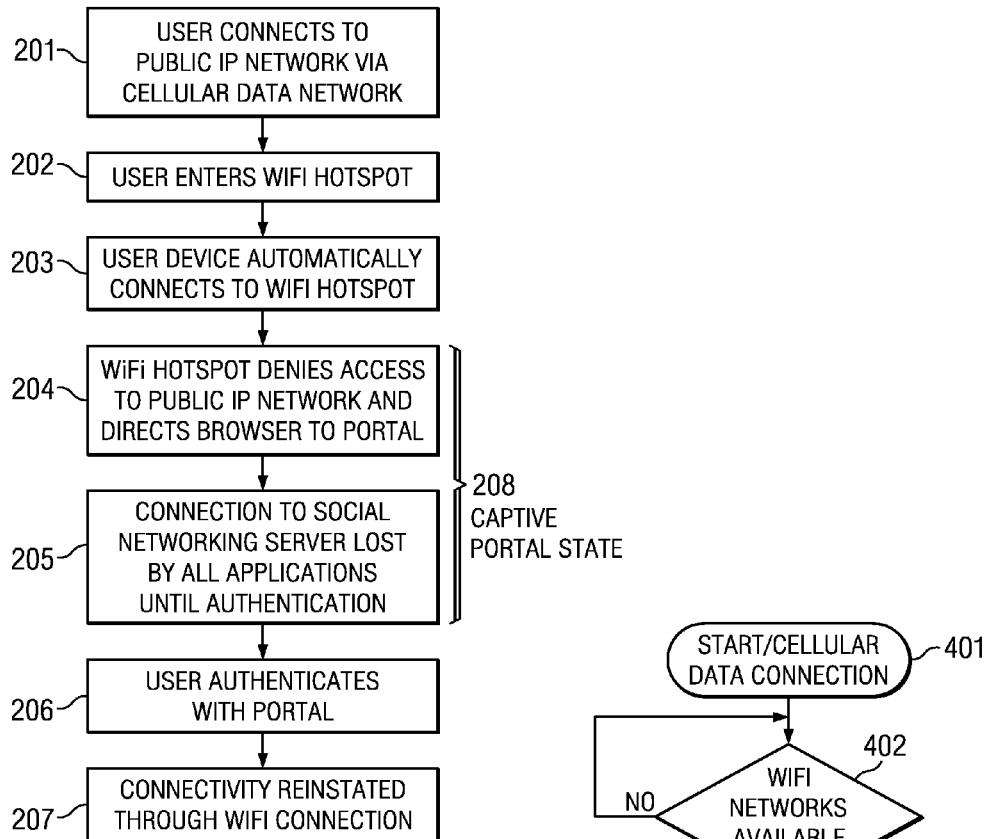
FIG. 2 illustrates example data-connectivity issues due to a captive-portal state.

FIG. 2 illustrates an example process that results in a loss of data connectivity due to mobile device 105 being trapped in the walled garden of a captive portal (herein referred to as the "captive portal state" 208).

At Step 201, mobile device 105 operates on cellular data mode only where no Wi-Fi networks are within range. At Step 202, the user operating mobile device 105 enters the coverage of a Wi-Fi hotspot, for example a hotel, airport terminal, coffeehouse, or the like.

At Step 203, mobile device automatically connects to the Wi-Fi hotspot. Although automatic connection most often results in captive portal state 208, a mobile device 105 may also end up in captive portal state 208 even when the user explicitly issues an instruction to connect to a Wi-Fi hotspot. For example, Wi-Fi networks implementing captive portals are almost exclusively public, unencrypted WLANs. Thus, a user may connect to a WLAN under the belief that the WLAN provides full internet access whereas the user's device is actually trapped in captive portal state 208.

At Steps 204-205, mobile device 105 remains trapped in captive portal state 208. Packets addressed from mobile device 105 to the Internet are not forwarded by the WLAN, whose default gateway or web server continues to bombard mobile device 105 with HTTP responses including content for the portal web page. Because non-browser mobile applications are not expecting, or cannot render these HTTP responses, they typically drop the packets, and the user may remain in captive portal state 208 indefinitely. For example, unless the user of mobile device 105 opens a browser window and is directed to the portal page, or notices that none of his or her other mobile applications are receiving updates, the user may never realize that he or she is trapped in captive portal state 208.

Provided that the user eventually notices and opens the web browser of mobile device 105, at Step 206 the user provides authentication credentials, such as a user name, password, payment information, promotional codes, agreeing to the terms of service, etc. to the captive portal, and at Step 207 data connectivity is restored through the Wi-Fi connection.

Figure 3:
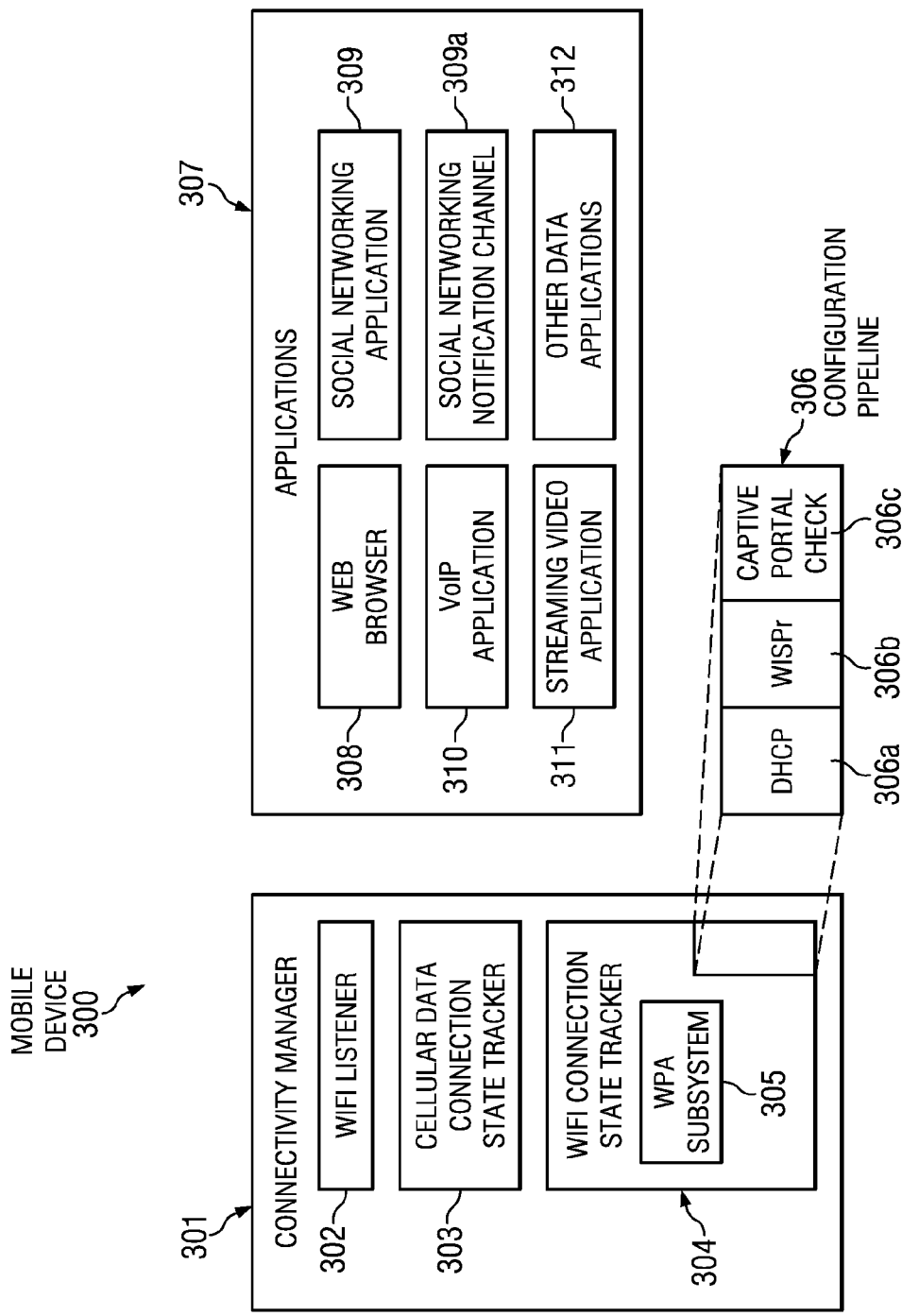
FIG. 3 illustrates example application modules of an example mobile device implementing example captive-portal-state detection and avoidance functionality.

FIG. 3 illustrates example software modules residing on a mobile device 300 implementing the captive portal state detection and avoidance functionality of particular embodiments. Mobile device 300 includes a connection manager application 301 and various user applications 307 requiring Internet connectivity. Applications 307, as previously discussed, may include, but are not limited to: web browser 308, social networking application 309, social networking notification channel 309*a* (which may be a component of social networking application 309), voice-over-IP (VoIP) application 310, or streaming video application 311. This disclosure contemplates any suitable application 312.

Connection manager 301 may be a third-party application or, more typically, built-in to the operating system of mobile device 300. Connectivity manager 301 includes a Wi-Fi listener module 302 that actively probes for available Wi-Fi networks. In particular embodiments, Wi-Fi listener module 302 may probe at predetermined intervals. In particular embodiments, the predetermined intervals are adjusted based on the location of mobile device 300, battery life, and other factors. This disclosure contemplates any suitable Wi-Fi listener module 302.

Connection manager 301 includes two connection state trackers, a cellular data connection state tracker 303 and Wi-Fi connection state tracker 304, each of which respectively manages the connection state of its associated wireless interface. It should be evident to those of ordinary skill in the art that connection manager 301 may have any number of connection state trackers for various wireless interfaces, such as for Bluetooth, WiMax, etc.

Wi-Fi connection state manager 304 includes a WPA Subsystem 305 and Configuration Pipeline 306. WPA subsystem 305 is responsible for connecting to the physical wireless media of a given Wi-Fi network, including encryption, authentication, and the like. In particular embodiments, WPA subsystem 305 may be included in the wireless network interface card (NIC) driver for mobile device 300. Configuration pipeline 306 comprises several processes, executed in sequence, that are responsible for configuring the wireless connection for use. In particular embodiments, a WLAN is not deemed "ready for use" until all processes 306*a-c* of configuration pipeline 306 have successfully completed execution.

DHCP process 306*a* implements the dynamic host configuration protocol (DHCP) and is responsible for obtaining an IP address from the WLAN. DHCP is well-known in the art and will not be discussed further here. In particular embodiments, configuration pipeline 306 includes a software process implementing WISPr (wireless internet service provider roaming) protocol. WISPr allows users to roam between wireless internet service providers, in a fashion similar to that used to allow cell-phone users to roam between carriers. A RADIUS server is used to authenticate the subscriber's credentials. In particular embodiments, WISPr utilizes an XML-based protocol to store authentication information in a client device and transmit it to a hotspot's RADIUS server, obviating the need for a user to interact with a captive portal. However, in such embodiments, connection problems with the WLAN itself may result in service interruption even after WLAN has authenticated a mobile device.

In particular embodiments configuration pipeline 306 supports other processes for configuring the wireless connection. For example, pipeline 306 may include a smart client that stores previously-used authentication credentials or cookies. In particular embodiments, pipeline 306 may include a process implementing International Roaming Access Protocols (IRAP). This disclosure contemplates any number of suitable software processes for execution in configuration pipeline 306.

As previously stated, configuration pipeline 306 includes sequential software processes that must be executed successfully before Wi-Fi connection state tracker 304 considers the wireless connection "fully connected." For example, typically when a mobile device connects to a Wi-Fi network it obtains an IP address through DHCP process 306*a*, and optionally performs any authentication required through WISPr. In particular embodiments, a captive portal check process 306*c* is appended to the end of configuration pipeline 306. As discussed in greater detail below, captive portal check process 306*c* detects whether the wireless network connection is in a captive portal state; Wi-Fi connection state tracker 304 will not consider the device "fully connected" to the WLAN if captive portal check process 306*c* detects a captive portal state.

Figure 4:
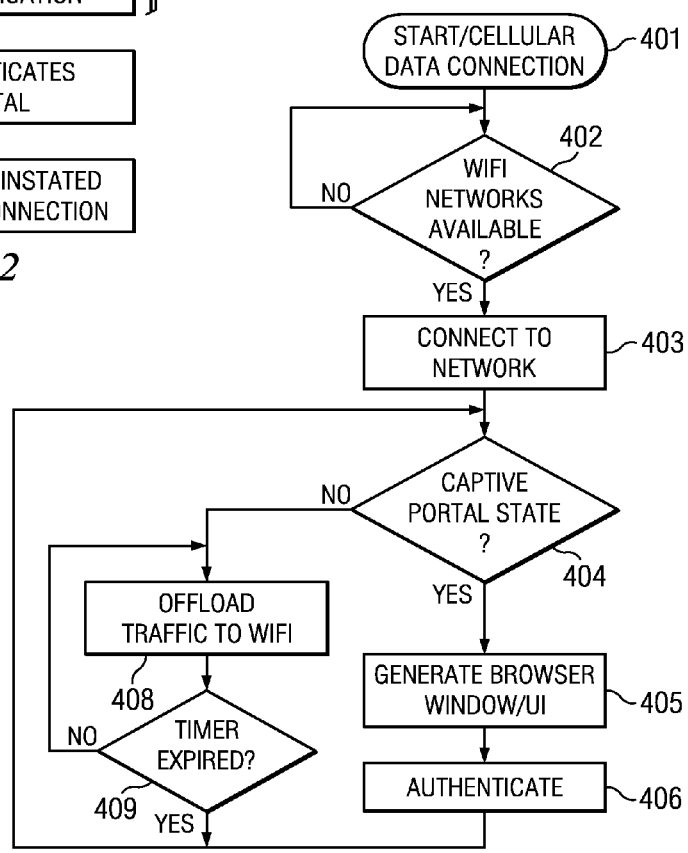
FIG. 4 illustrates an example method for detecting and avoiding a captive-portal state.

FIG. 4 illustrates an example method for detecting and avoiding a captive portal state for dual-interface mobile device 300. The method may begin at step 401, where mobile device 300 connects to the Internet via its carrier's cellular data network, such as network 102. At Step 402, Wi-Fi listener 302 actively probes for available Wi-Fi networks as previously described. If no networks are found, the process loops back to 402 after a predetermined amount of time, or in accordance with the policies of Wi-Fi listener 302. If a Wi-Fi network is detected, the process proceeds to Step 403.

At Step 403, mobile device 300 connects to one of the detected Wi-Fi networks by executing the individual processes in configuration pipeline 306. As previously discussed, mobile device 300 may connect to a detected Wi-Fi network automatically, or in response to explicit user instruction. In particular embodiments, mobile device ranks or scores available Wi-Fi networks and automatically connects to the network it deems the "best" network. In particular embodiments, mobile device ranks or scores available Wi-Fi networks and provides a sorted list of networks to the user for the user to issue an explicit connection instruction. In particular embodiments, mobile device 300 may obtain Wi-Fi network scores from an external node through its cellular data connection 102a. For example, mobile device 300 may transmit a request to a third-party server with the SSIDs of available networks and its physical location. In response, the third-party server may transmit scores for each of the identified Wi-Fi networks based on other users' reported experiences. Similarly, when mobile device 300 connects to a particular Wi-Fi network, mobile device 300 may transmit performance metrics such as bandwidth, latency, number of devices on the network, etc. or a user-filled survey of the quality of the network. In such embodiments, the rating and subsequent ranking of Wi-Fi networks is based on crowd-sourced data. This disclosure contemplates any suitable means of selecting and connecting to a Wi-Fi network. At Step 403, mobile device 300 executes all but the last step of configuration pipeline 306; including obtaining an IP address via DHCP process 306a, and any built-in authentication through WISPr process 306b. During Steps 403-406, mobile device 300 maintains its data connection to the public IP network via cellular data network 102.

At Step 404, mobile device 300 executes captive portal check 306c in configuration pipeline 306. Captive portal check 306c is described in further detail with reference to FIG. 5. If captive portal check process 306c determines that mobile device 300 is connected to a captive portal via its Wi-Fi interface, the process proceeds to Step 405. If not, the process jumps to Step 406, where mobile device 300 begins using the connected Wi-Fi network to communicate with the public IP network. In embodiments where mobile device 300 utilizes mobile IP, such a handover comprises transmitting via Wi-Fi network 103 its new CoA to its home agent 107.

At step 405, upon detecting that the Wi-Fi connection is in the captive portal state (i.e., trapped in the walled garden of a captive portal), mobile device 300 generates a browser window and downloads the portal page from the captive portal. In particular embodiments, all non-captive portal traffic, utilizing the mobile data interface, continues to be transmitted and received, uninterrupted, over the mobile data interface. For example, if a user is engaged in a chat session when moving from an area lacking WiFi connectivity to an WiFi area having WiFi coverage, data continues to flow to and from the mobile device to the chat server over the mobile data interface until traffic is offloaded. In particular embodiments, the browser window generated by mobile device 300 may have additional custom user interface elements. The generated browser window is described in further detail with reference to FIG. 7. Because, at Step 405, mobile device 300 is maintaining two concurrent wireless connections and two IP addresses (one for wireless cellular network 102 and one for Wi-Fi-network 103), mobile device 300 binds the generated browser window to its Wi-Fi interface in order to prevent incorrect delivery. Thus, all HTTP requests, HTTP responses, DNS request/responses, or other open-socket connections generated by the browser window are forced to utilize the Wi-Fi interface. In particular embodiments, this binding may be achieved by modifying the browser stack of the generated browser window. This disclosure contemplates any suitable method of directing all traffic from the generated browser window to the Wi-Fi interface.

At Step 406, the user interacts with the generated browser window to enter authentication credentials. As previously discussed, authentication credentials may range from a username/password, payment information, and promotional codes; to merely agreeing to the terms of service of the Wi-Fi network provider. When the user clicks a "submit" or "go" button in the captive portal content, the authentication credentials are submitted to the captive portal for verification. If the authentication credentials are valid, the captive portal may, depending on the implementation, transmit an ACK to the user. In other implementations, the captive portal may simply grant mobile device 300 Internet access. In particular embodiments, upon receiving an acknowledgement that the submitted authentication credentials are valid, mobile device 300 may proceed to Step 408 and offload traffic to the Wi-Fi connection. However, in such embodiments, there may still be user service interruption if the captive portal's connection to the public IP network is malfunctioning.

Thus, in particular embodiments, after submitting valid authentication credentials, the process returns to the captive portal state check in Step 404 to ensure that the Wi-Fi connection may reach the public IP network.

At Step 408, mobile device 300 offloads data traffic to the Wi-Fi connection 103a. In particular embodiments, mobile device 300 may offload only a portion of data traffic to Wi-Fi connection 103a. For example, DSMIP permits application-based offloading, so that bandwidth-intensive applications may be offloaded to a higher-bandwidth network. As another example, DSMIP may offload only traffic that is not latency sensitive traffic to the network that experiences less latency. In particular embodiments, the traffic offloading may be flow-based. For example, 3GPP release 10 introduced the ability to register multiple local CoAs to a single HoA, and bind different IP flows (e.g., http, video, VoIP, etc.) to a different CoA or directly to the HoA. Thus some traffic may be anchored to mobile device 300's HA 107, such as VPN or video traffic, while some traffic may be completely offloaded to the WLAN without traversing the WLAN, such as HTTP. This disclosure contemplates any suitable method of offloading all or part of the data traffic of mobile device 300 from its wireless cellular network interface to its Wi-Fi interface.

Particular captive portals may revert back to the captive portal state and relegate connected devices to its walled garden after a predetermined amount of time. For example, if a user purchases a 1 hour pass to a hotspot, the captive portal may re-initiate packet redirection upon the expiry of the one-hour pass, forcing the user to purchase additional time. As previously discussed, because many users require data connectivity to the Internet for other purposes than web browsing, the user may be unaware that his or her device has lost internet connectivity. Thus, in particular embodiments, mobile device 300 may perform the captive portal state check of Step 404. Upon passing the captive portal state check at Step 404, or alternatively, upon offloading traffic to the Wi-Fi interface at Step 408, mobile device 300 begins a timer indicating the time until the next captive portal state check. If the timer expires at Step 409, the process returns to Step 404 and performs a captive portal state check.

It should be obvious to persons or ordinary skill in the art that the process of FIG. 4 may be interrupted at any moment if mobile device 300 completely loses its Wi-Fi connection due to, for example, the user leaving the Wi-Fi hotspot's coverage area. It should be equally evident that, under such circumstances, mobile device 300 will shift all data traffic back to its wireless cellular network interface.

Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
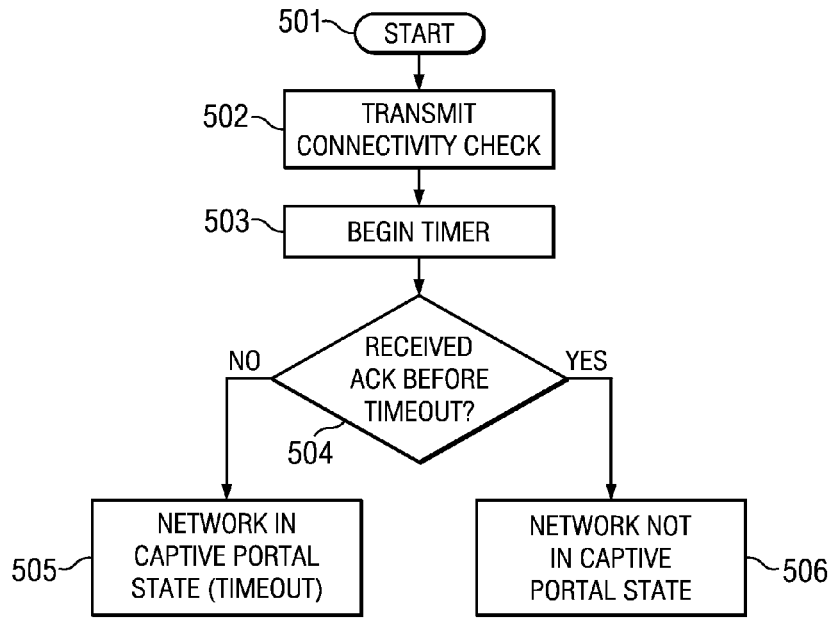
FIG. 5 illustrates an example method for detecting a captive-portal state.

FIG. 5 illustrates an example method of detecting a captive portal state. In particular embodiments, the method of FIG. 5 is implemented by captive-portal-state detection process 306c in configuration pipeline 306. In particular embodiments, mobile device 300 may skip other unnecessary processes in configuration pipeline 306. For example, when mobile device periodically performs a captive-portal-state check (as in Step 409) for an existing Wi-Fi connection, there is no need to perform DHCP process 306a or WISPr authentication 306b. In particular embodiments, the full configuration pipeline 306 is executed only upon first connecting to a Wi-Fi network.

The method may begin at step 501, where mobile device determines, based off a predetermined set of rules or internal timer, to check whether it is in the captive portal state. At Step 502, mobile device 300 transmits a connectivity check to an external node in the Internet. In particular embodiments, the connectivity check may be to a well-known domain, such as www.facebook.com. In particular embodiments, the external node may be one or more servers of a distributed content delivery network, such as Akamai. In particular embodiments, the connectivity check may be as simple as a ping request. In particular embodiments, the connectivity check may request a certain identifier to be included in the response. In particular embodiments, the response may include a unique, non-cacheable identifier. This disclosure contemplates any suitable connectivity check request or response message.

At step 503, mobile device 300 begins a timer substantially simultaneously with the transmission of the connectivity check message. In particular embodiments, the timer may be a countdown timer that begins with a predetermined timeout duration, for example, 400 ms. If a connectivity check response message is received prior to the expiration of the timer (step 504), mobile device at step 505 determines that the Wi-Fi connection is not in the captive portal state, at which point the method may end. On the other hand, if no response is received before the timeout expires, mobile device 3001 identifies the Wi-Fi connection as being in a captive-portal state (step 506), at which point the method may end.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
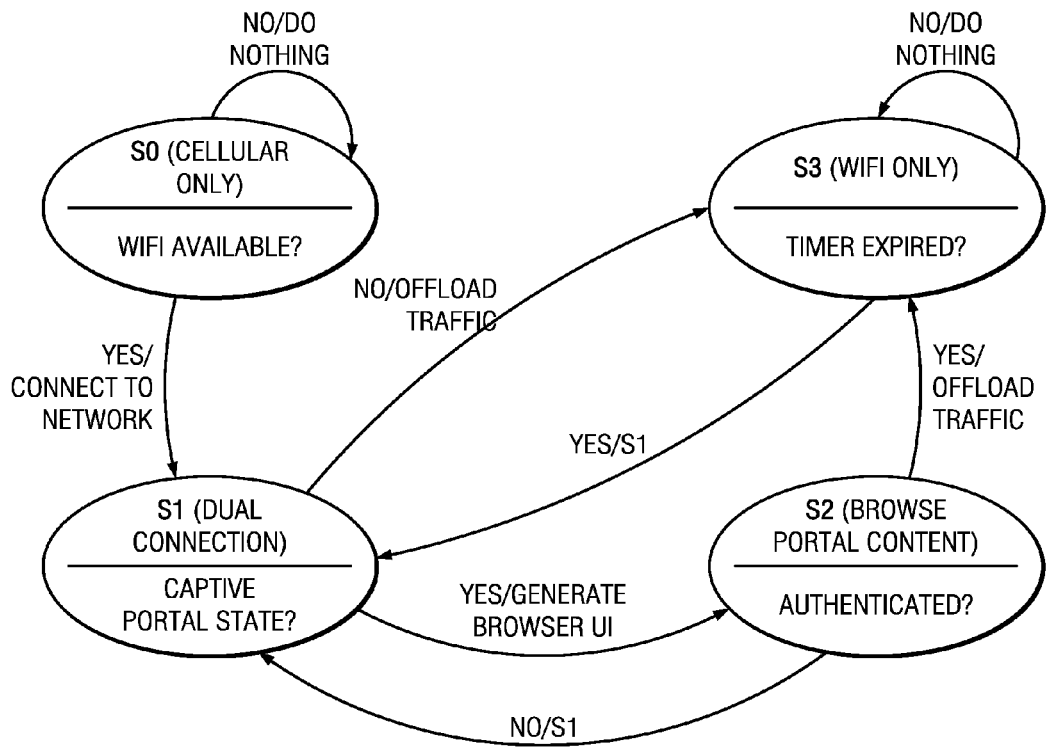
FIG. 6 is an example state diagram for a mobile device implementing example captive-portal-state detection and avoidance.

FIG. 6 depicts the methods of FIGS. 4 and 5 in a state diagram. As one of ordinary skill in the art may comprehend, the method of FIG. 4 is not simply a routine that is executed only once, but rather continuously monitors both Wi-Fi connectivity as well as pubic IP network access through the Wi-Fi network.

The state diagram of FIG. 6 contains four states. In state S0, mobile device 300 is connected to the public IP network through only its cellular radio interface. During this state, the Wi-Fi listener of mobile device 300 periodically checks for available Wi-Fi networks by transmitting probe messages or searching for broadcast SSIDs, as previously described. If no networks are found, mobile device 300 remains in state S0. If networks are found, mobile device 300 connects to the network and transitions to state S1.

In state S1, mobile device 300 is connected to its carrier's wireless cellular data network as well as a detected Wi-Fi network, but has not offloaded any traffic to its Wi-Fi interface. At S1, mobile device 300 performs the captive portal state check of FIG. 5 to determine if it is trapped in the walled garden of the captive portal. If not, mobile device transitions to state S3. If mobile device 300 determines its Wi-Fi connection is trapped in the captive portal state, it transitions to state S2.

At state S3, mobile device 300 shifts some or all of its traffic (as previously discussed) to the Wi-Fi network. Additionally, mobile device 300 initiates a timer that, upon expiration signals to perform another captive portal state check.

At state S2, mobile device 300 generates a browser window bound to its Wi-Fi interface and including content downloaded from the connected captive portal. The user may provide authentication information as previously discussed.

It should be evident to one of ordinary skill in the art that a user may simply choose to remain on the cellular network rather than using Wi-Fi, for example, if the user does not wish to pay for Internet access. In such embodiments, when the user declines to connect to the Wi-Fi network (as discussed with reference to FIG. 7), mobile device 300 returns to state S0 and periodically scans for networks other than the network declined by the user. As previously discussed, in particular embodiments, if, at any of states S1, S2, or S3, mobile device 300 loses Wi-Fi connectivity, mobile device 300 simply shifts all traffic back to its wireless cellular radio interface and returns to state S0.

Figure 7:
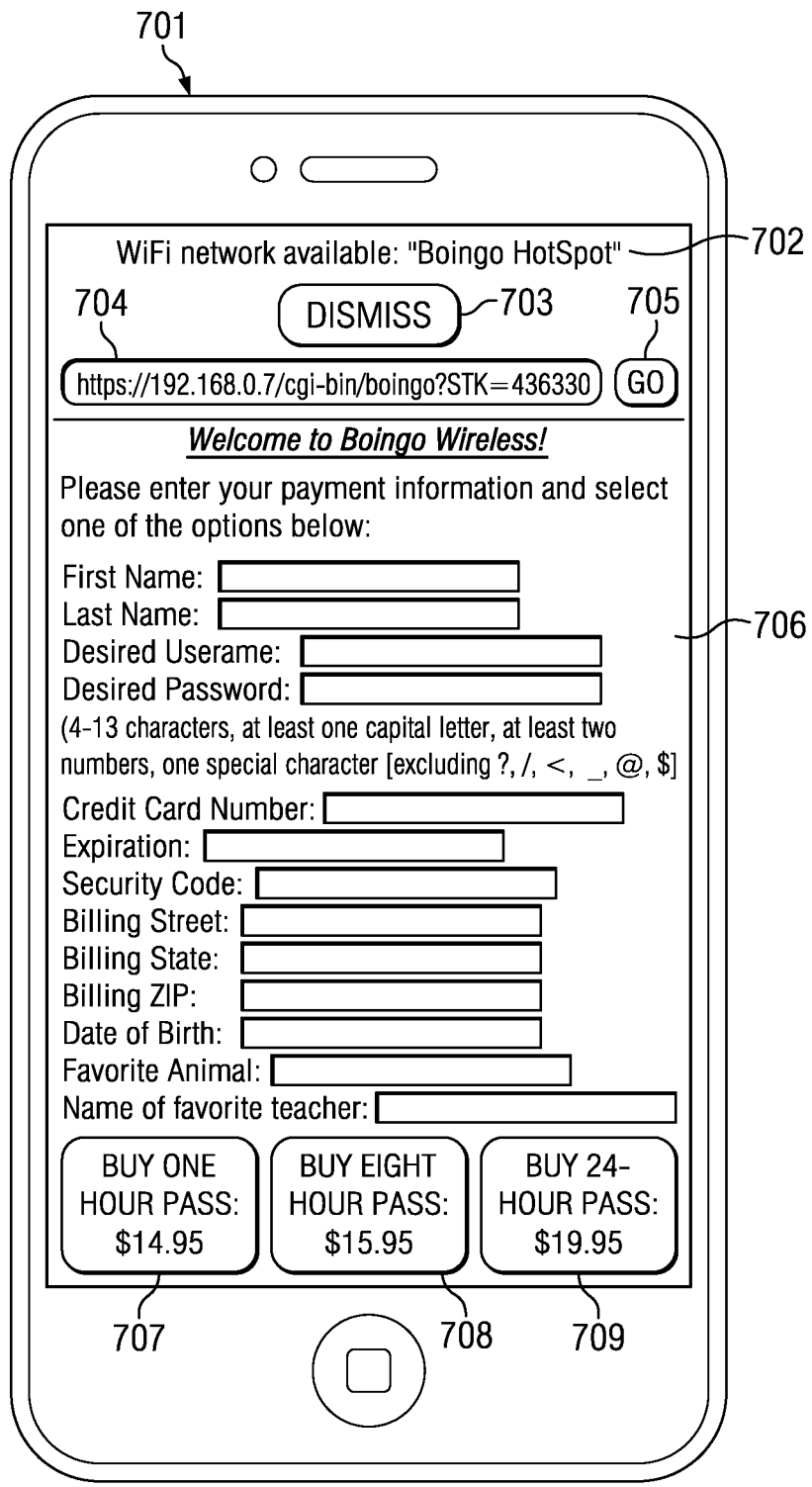
FIG. 7 illustrates an example mobile device interface.

FIG. 7 illustrates a mobile device 300 displaying a browser window 701 generated in response to the detection of a captive portal state (Step 405 of FIG. 4 or state S2 of FIG. 6). In particular embodiments, browser window 701 includes a user interface area 702 generated by mobile device 300, and a content area 706 obtained from the gateway or server of the captive portal. In particular embodiments, mobile device 300 has no control over the content displayed in content area; it merely downloads and renders the content from the captive portal.

User interface area 702 includes, in particular embodiments, the name of the wireless network (in this case, "Boingo HotSpot.") In particular embodiments, the name is the network SSID. In particular embodiments, the name of the network is obtained from a third-party service based on the SSID and location of mobile device 300. This disclosure contemplates any suitable method of identifying the current wireless network. In particular embodiments, user interface area 702 also includes dismiss button 703. In such embodiments, user selection of dismiss button 703 causes mobile device to close browser window 702 and leave all data traffic on the wireless cellular interface. In particular embodiments, selection of dismiss button 703 causes mobile device to remove the current network from the list of available networks. In particular embodiments, mobile device 300 will not connect to any dismissed networks in the future. In particular embodiments, selecting dismiss button 703 causes mobile device 300 to display a menu of potential actions regarding the current network, such as "do not prompt me for this network again." This disclosure contemplates any suitable manner of dismissing or closing browser window 701 or applying network-based policies to the currently connected network. In particular embodiments, user interface area 702 also includes standard navigation bar 704 and "go" button 705. As should be readily apparent by one of ordinary skill in the art, navigation bar 704 displays the URL of the currently displayed content, while "go" button 705 submits an http request for the URL in navigation bar 704.

Content area 706, as previously discussed, merely displays the content obtained from the captive portal, generally an html web page stored locally on the gateway of the captive portal, or on a separate server connected to the captive portal. For example purposes, FIG. 7 depicts a captive portal page in content area 706 that includes multiple fields for payment processing, including but not limited to, first name, last name, credit card number, expiration date, and billing address. In particular implementations, the captive portal page may merely list a set of terms and conditions with a single button indicating the user agrees to the terms of service/use of the wireless network provider. For didactic purposes, content area 706 also includes various access options 707 708, and 709 that, when selected, charge the user's credit card the displayed amount and grant mobile device 300 access to the public IP network for the displayed duration. After successful authentication, the captive portal may grant the user access to the Internet, and mobile device 300 may proceed to perform a connectivity check (Step 404 and state S1) before offloading some or all data traffic to the Wi-Fi network.

Figure 8:
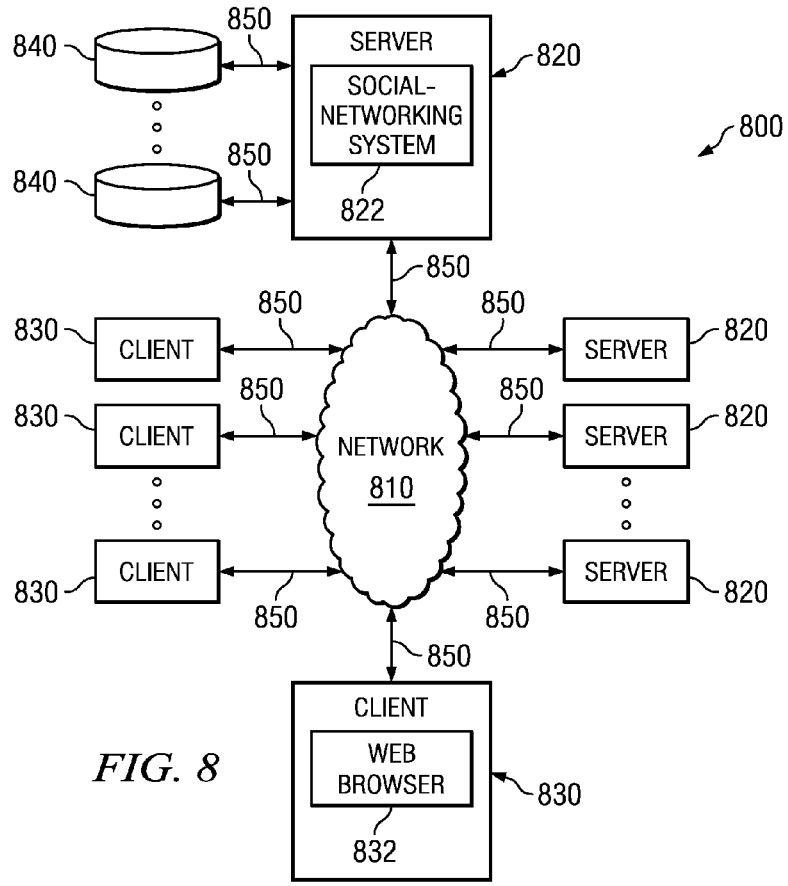
FIG. 8 illustrates an example network environment.

Particular embodiments may be implemented in a network environment. FIG. 8 illustrates an example network environment 800. Network environment 800 includes a network 810 coupling one or more servers 820 and one or more clients 830 to each other. In particular embodiments, network 810 is an intranet, an extranet, a virtual private network (VPN), a local area network (LAN), a wireless LAN (WLAN), a wide area network (WAN), a metropolitan area network (MAN), a portion of the Internet, or another network 810 or a combination of two or more such networks 810. This disclosure contemplates any suitable network 810.

One or more links 850 couple a server 820 or a client 830 to network 810. In particular embodiments, one or more links 850 each includes one or more wireline, wireless, or optical links 850. In particular embodiments, one or more links 850 each includes an intranet, an extranet, a VPN, a LAN, a WLAN, a WAN, a MAN, a portion of the Internet, or another link 850 or a combination of two or more such links 850. This disclosure contemplates any suitable links 850 coupling servers 820 and clients 830 to network 810.

In particular embodiments, each server 820 may be a unitary server or may be a distributed server spanning multiple computers or multiple datacenters. Servers 820 may be of various types, such as, for example and without limitation, web server, news server, mail server, message server, advertising server, file server, application server, exchange server, database server, or proxy server. In particular embodiments, each server 820 may include hardware, software, or embedded logic components or a combination of two or more such components for carrying out the appropriate functionalities implemented or supported by server 820. For example, a web server is generally capable of hosting websites containing web pages or particular elements of web pages. More specifically, a web server may host HTML files or other file types, or may dynamically create or constitute files upon a request, and communicate them to clients 830 in response to HTTP or other requests from clients 830. A mail server is generally capable of providing electronic mail services to various clients 830. A database server is generally capable of providing an interface for managing data stored in one or more data stores. In particular embodiments, a social-networking system 822, implementing a social-networking website, may be hosted on one or more servers 820.

In particular embodiments, one or more data storages 840 may be communicatively linked to one or more severs 820 via one or more links 850. In particular embodiments, data storages 840 may be used to store various types of information. In particular embodiments, the information stored in data storages 840 may be organized according to specific data structures. In particular embodiments, each data storage 840 may be a relational database. Particular embodiments may provide interfaces that enable servers 820 or clients 830 to manage, e.g., retrieve, modify, add, or delete, the information stored in data storage 840.

In particular embodiments, each client 830 may be an electronic device including hardware, software, or embedded logic components or a combination of two or more such components and capable of carrying out the appropriate functionalities implemented or supported by client 830. For example and without limitation, a client 830 may be a desktop computer system, a notebook computer system, a netbook computer system, a handheld electronic device, or a mobile telephone. This disclosure contemplates any suitable clients 830. A client 830 may enable a network user at client 830 to access network 830. A client 830 may enable its user to communicate with other users at other clients 830.

A client 830 may have a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 830 may enter a Uniform Resource Locator (URL) or other address directing the web browser 832 to a server 820, and the web browser 832 may generate a Hyper Text Transfer Protocol (HTTP) request and communicate the HTTP request to server 820. Server 820 may accept the HTTP request and communicate to client 830 one or more Hyper Text Markup Language (HTML) files responsive to the HTTP request. Client 830 may render a web page based on the HTML files from server 820 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like.

Herein, reference to a web page encompasses one or more corresponding web page files (which a browser may use to render the web page) and vice versa, where appropriate.

Figure 9:
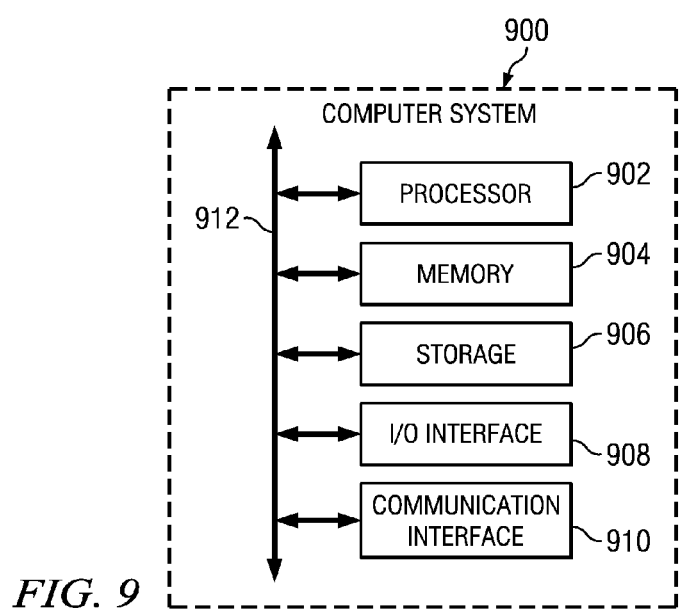
FIG. 9 illustrates an example computer system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Figure 10:
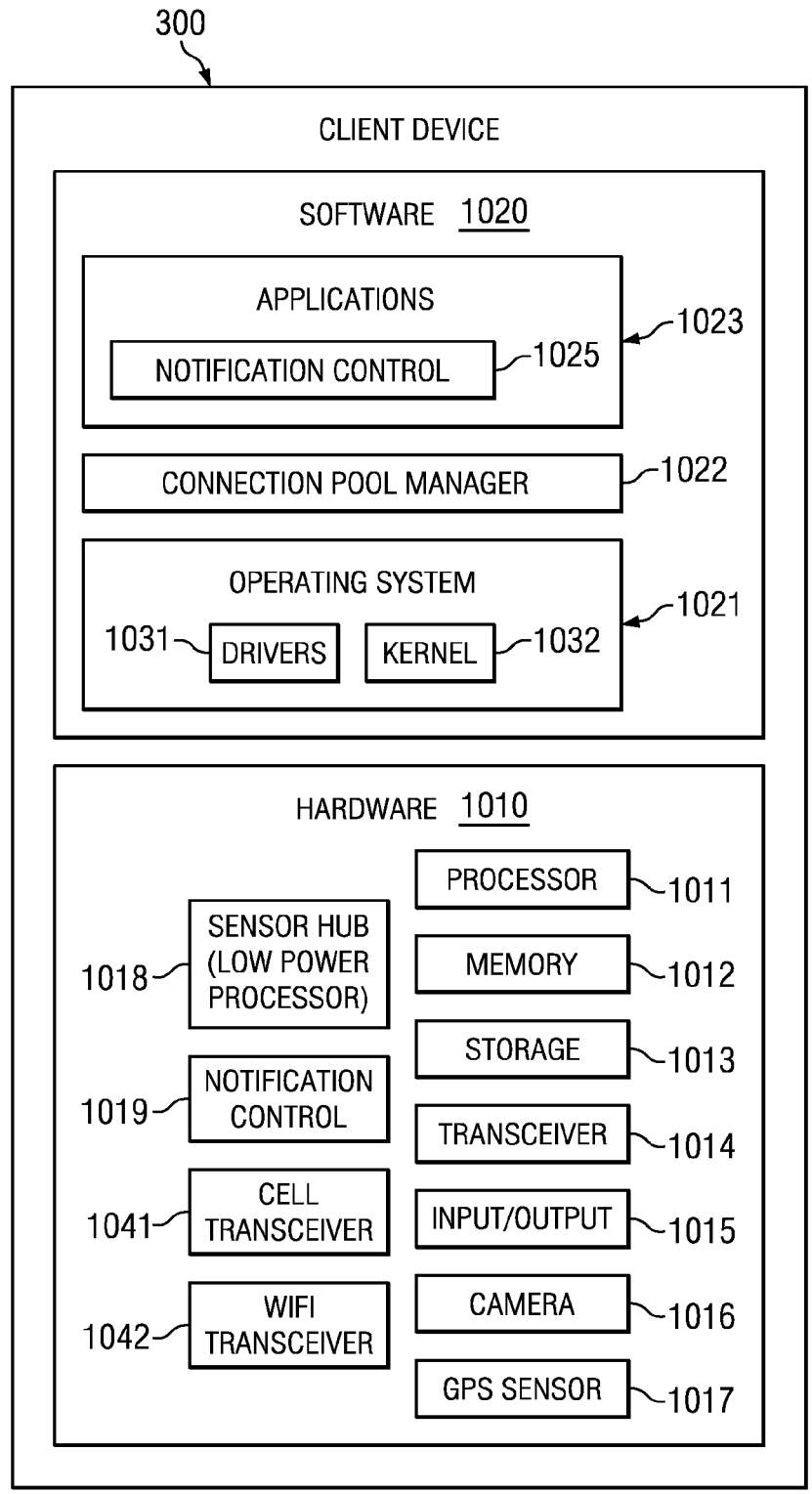
FIG. 10 illustrates an example mobile device.

FIG. 10 illustrates an example client device 300. In particular embodiments, a client 300 may include hardware, firmware, and software. In particular embodiments, client device 300 may be a smart phone (e.g., iPhone, Android-based phone, or Blackberry), which is a mobile telephone that offers more advanced computing ability and connectivity than a traditional mobile phone. It may be considered as a handheld computer integrated with a mobile phone. In particular embodiments, client device 300 may be a netbook or tablet computer (e.g., iPad, Android-based tablets). Client device 300 may be connected to a network through a wireless connection, such as a GSM or CDMA2000-based wireless cellular network.

In particular embodiments, client device 300 may include hardware 1010 and software 1020. In particular embodiments, hardware 210 may include any number of hardware components such as, for example and without limitation, processor 1011, memory 1012, storage 1013, transceiver 1014, input/output device 1015 (e.g. display, touch screen, keypad, microphone, speaker, etc.), camera 1016, global positioning system (GPS) sensor 1017, sensors hub 1017, notification control switch 1019, cellular transceiver 1041, Wi-Fi transceiver 1042, and so on. In particular embodiments, hardware 1010 may include wireless display (WiDi) transceivers, Bluetooth low-energy (BLE) transceivers, near-field communications (NFC) transceivers, 802.11 Wi-Fi and 802.16 WiMax transceivers, and the like. This disclosure contemplates any suitable hardware components. In particular embodiments, location determination may be performed by the social networking system even when mobile device 300 does not perform or share any self-determined position information. For example, the social networking system may maintain a physical map f all Wi-Fi networks, and determine the location of client device 300 from its IP address. This disclosure contemplates any suitable manner of determining the location of client device 300. In particular embodiments, some or all of a user's user data may be stored in storage 1013.

In particular embodiments, software 1020 may include an operating system 1021, which may include a kernel 1031 or any number of device drivers 1032 corresponding to some of the hardware components available on client device 300. Operating system 1021 may be selected for client device 300 based on the actual type of device client device 300 is. For example, if client device 300 is a mobile device (e.g., a smart phone), then operating system 1021 may be a mobile operating system such as, for example and without limitation, Microsoft's. Windows Mobile, Google's Android, Nokia's Symbian, Apple's iOS, and Samsung's Bada.

In particular embodiments, there may be a connection pool manager 1022 residing and executing on client device 300, which may be implemented as computer software. In particular embodiments, one or more software applications 1023 may be executed on client device 300. In particular embodiments, they may be native applications installed and residing on client device 300. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 1016; a fifth application may allow the device user to receive and initiate VoIP or cellular network calls, and so on. In particular embodiments, there may be a software application (e.g., notification control 1025) that enables the device user to manage the notifications pushed to client device 300. Each software application 1020 may have a user interface and may implement one or more specific functionalities. Each software application 1020 may include one or more software modules implementing the individual functionalities. The executable code of software applications 1020, including notification control 1025, may be stored in a computer-readable and non-transitory medium (e.g., storage 1013 or memory 1012) on client device 300.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. One or more non-transitory computer-readable storage media embodying logic that is operable, when executed by one or more computing systems, to:
   at a computing device, while maintaining a cellular connection with a cellular data network, establish a wireless connection with a wireless local-area network (WLAN);
   at the computing device, after successfully establishing the wireless connection with the WLAN, determine whether the computing device has internet access through the WLAN prior to offloading data traffic from the cellular connection to the wireless connection;
   at the computing device, in response to determining that the computing device has Internet access through the WLAN, offload the data traffic from the cellular connection to the wireless connection; and
   at the computing device, in response to determining that the computing device does not have Internet access through the WLAN, authenticate the computing device to a portal hosted by the WLAN before offloading the data traffic from the cellular connection to the wireless connection,
   wherein the offloading of the data traffic from the cellular connection to the wireless connection is directly controlled by a service provider network.

2. The media of claim 1, further comprising instructions operable, when executed, to:
   at the computing device, when it is determined that the computing device does not have Internet access through the WLAN, then:
      generate and display a user interface comprising content from the portal hosted by the WLAN; and bind the data traffic associated with the user interface to a WLAN interface of the computing device.

3. The media of claim 2, further comprising instructions operable, when executed, to:
at the computing device, receive, via the user interface, authentication credentials;
at the computing device, submit the authentication credentials to the portal; and
at the computing device, in response to receiving an authorization granted message from the portal, offload the data traffic from the cellular connection to the wireless connection.

4. The media of claim 1, wherein determining whether the computing device has Internet access through the WLAN comprises:
transmitting a connectivity check via the wireless connection to an endpoint;
starting a timer immediately after the transmission of the connectivity check;
if no response is received from the endpoint prior to an expiration of the timer, identifying the computing device as not having Internet access through the WLAN; and
if a response is received from the endpoint prior to the expiration of the timer, identifying the computing device as having Internet access through the WLAN.

5. The media of claim 1, wherein
the data traffic of the cellular connection comprises data of a communication session between an application of the computing device and a server computing device;
maintaining the cellular connection with the cellular data network comprises maintaining the communication session; and
offloading the data traffic from the cellular connection to the wireless connection comprises directing data of the communication session from the cellular connection to the wireless connection.

6. The media of claim 1, further comprising instructions operable, when executed, to:
at the computing device, monitor one or more properties of the wireless connection;
at the computing device, terminate the wireless connection based on the one or more properties of the wireless connection; and
at the computing device, offload the data traffic from the wireless connection to the cellular connection.

7. The media of claim 1, wherein:
a wireless network state tracker of the computing device periodically determines whether the computing device has Internet access through the WLAN.

8. An apparatus comprising:
one or more processors;
one or more non-transitory computer-readable storage media embodying logic that is operable, when executed by the one or more processors, to:
at a computing device, while maintaining a cellular connection with a cellular data network, establish a wireless connection with a wireless local-area network (WLAN);
at the computing device, after successfully establishing the wireless connection with the WLAN, determine whether the computing device has internet access through the WLAN prior to offloading data traffic from the cellular connection to the wireless connection;
at the computing device, in response to determining that the computing device has Internet access through the WLAN, offload the data traffic from the cellular connection to the wireless connection; and
at the computing device, in response to determining that the computing device does not have Internet access through the WLAN, authenticate the computing device to a portal hosted by the WLAN before offloading the data traffic from the cellular connection to the wireless connection,
wherein the offloading of the data traffic from the cellular connection to the wireless connection is directly controlled by a service provider network.

9. The apparatus of claim 8, the one or more media further comprising instructions operable, when executed by the one or more processors, to:
at the computing device, when it is determined that the computing device does not have Internet access through the WLAN, then:
generate and display a user interface comprising content from the portal hosted by the WLAN; and
bind the data traffic associated with the user interface to a WLAN interface of the computing device.

10. The apparatus of claim 9, the one or more media further comprising instructions operable, when executed by the one or more processors, to:
at the computing device, receive, via the user interface, authentication credentials;
at the computing device, submit the authentication credentials to the portal; and
at the computing device, in response to receiving an authorization granted message from the portal, offload the data traffic from the cellular connection to the wireless connection.

11. The apparatus of claim 8, wherein determining whether the computing device has Internet access through the WLAN comprises:
transmitting a connectivity check via the wireless connection to an endpoint;
starting a timer immediately after the transmission of the connectivity check;
if no response is received from the endpoint prior to an expiration of the timer, identifying the computing device as not having Internet access through the WLAN; and
if a response is received from the endpoint prior to the expiration of the timer, identifying the computing device as having Internet access through the WLAN.

12. The apparatus of claim 8, wherein:
the data traffic of the cellular connection comprises data of a communication session between an application of the computing device and a server computing device;
maintaining the cellular connection with the cellular data network comprises maintaining the communication session; and
offloading the data traffic from the cellular connection to the wireless connection comprises directing data of the communication session from the cellular connection to the wireless connection.

13. The apparatus of claim 8, the one or more media further comprising instructions operable, when executed by the one or more processors, to:
at the computing device, monitor one or more properties of the wireless connection;
at the computing device, terminate the wireless connection based on the one or more properties of the wireless connection; and
at the computing device, offload the data traffic from the wireless connection to the cellular connection.

14. The apparatus of claim 8 wherein:
a wireless network state tracker of the computing device periodically determines whether the computing device has Internet access through the WLAN.

15. A method comprising:
by a computing device, while maintaining a cellular connection with a cellular data network, establishing a wireless connection with a wireless local-area network (WLAN);
by the computing device, after successfully establishing the wireless connection with the WLAN, determining whether the computing device has internet access through the WLAN prior to offloading data traffic from the cellular connection to the wireless connection;
by the computing device, in response to determining that the computing device has Internet access through the WLAN, offloading the data traffic from the cellular connection to the wireless connection; and
by the computing device, in response to determining that the computing device does not have Internet access through the WLAN, authenticating the computing device to a portal hosted by the WLAN before offloading the data traffic from the cellular connection to the wireless connection,
wherein the offloading of the data traffic from the cellular connection to the wireless connection is directly controlled by a service provider network.

16. The method of claim 15, further comprising:
by the computing device, when it is determined that the computing device does not have Internet access through the WLAN, then:
generating and displaying a user interface comprising content from the portal hosted by the WLAN; and
binding the data traffic associated with the user interface to a WLAN interface of the computing device.

17. The method of claim 16, further comprising:
by the computing device, receiving, via the user interface, authentication credentials;
by the computing device, submitting the authentication credentials to the portal; and
by the computing device, in response to receiving an authorization granted message from the portal, offloading the data traffic from the cellular connection to the wireless connection.

18. The method of claim 15, wherein determining whether the computing device has Internet access through the WLAN comprises:
transmitting a connectivity check via the wireless connection to an endpoint;
starting a timer immediately after the transmission of the connectivity check;
if no response is received from the endpoint prior to an expiration of the timer, identifying the computing device as not having Internet access through the WLAN; and
if a response is received from the endpoint prior to the expiration of the timer, identifying the computing device as not having Internet access through the WLAN.

19. The method of claim 15, wherein:
the data traffic of the cellular connection comprises data of a communication session between an application of the computing device and a server computing device;
maintaining the cellular connection with the cellular data network comprises maintaining the communication session; and
offloading the data traffic from the cellular connection to the wireless connection comprises directing data of the communication session from the cellular connection to the wireless connection.

20. The method of claim 15, further comprising:
by the computing device, monitoring one or more properties of the wireless connection;
by the computing device, terminating the wireless connection based on the one or more properties of the wireless connection; and
by the computing device, offloading the data traffic from the wireless connection to the cellular connection.

* * * * *